May 19, 1942.   F. A. MILLER ET AL   2,283,222
RIFLING TOOL
Filed July 8, 1940

INVENTOR
Frank A. Miller
John D. DeVoge
BY GJKessenich & JH Church
ATTORNEY

Patented May 19, 1942

2,283,222

UNITED STATES PATENT OFFICE 2,283,222

RIFLING TOOL

Frank A. Miller, Troy, and John D. De Voge, Watervliet, N. Y.

Application July 8, 1940, Serial No. 344,316

6 Claims. (Cl. 29—96)

(Granted under the act of March 3, 1883, as amended April 30, 1928; 370 O. G. 757)

The invention described herein may be manufactured and used by or for the Government for governmental purposes, without the payment to us of any royalty thereon.

The subject of this invention is a rifling tool.

The purpose of the invention is to provide a rifling tool in which the cutter is securely held to prevent roughness, waviness and unequal depth of the cut due to vibration of the cutter and in which the scoring of the work and of the guide bearings is avoided.

The invention further resides in the provision of a bearing member having hard facing inserts and having means for conducting oil to the cutter.

The specific nature of the invention as well as other objects and advantages thereof will clearly appear from a description of a preferred embodiment as shown in the accompanying drawing in which.

Figure 1:
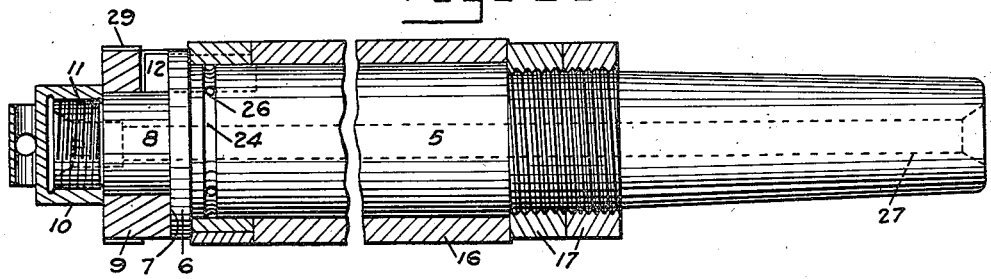
Fig. 1 is a view in side elevation and partly in section of the rifling tool.
Figure 2:
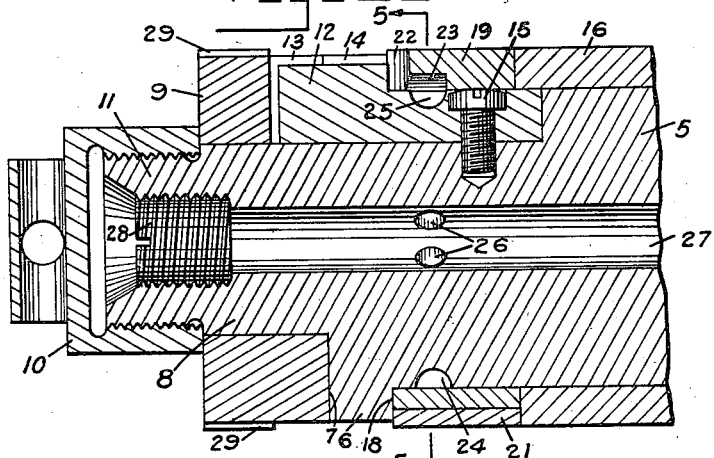
Fig. 2 is an enlarged longitudinal sectional view of the head on the line 2—2 of Fig. 5.
Figure 3:
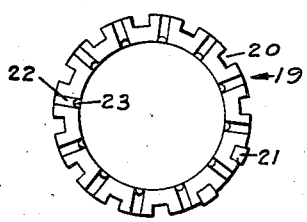
Fig. 3 is a detail end view of the collar.
Figure 4:
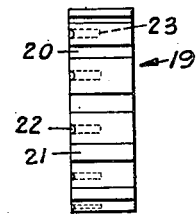
Fig. 4 is a view in side elevation thereof.
Figure 5:
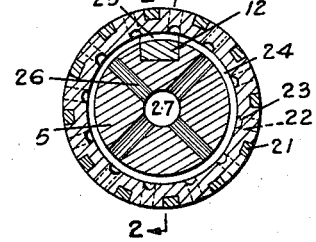
Fig. 5 is a reduced sectional view on the line 5—5 of Fig. 2.

Referring to the drawings by characters of reference the rifling tool comprises a cylindrical body 5 having adjacent its front end an annular flange 6 with a forwardly facing shoulder 7 that extends to a reduced portion 8. A cutter 9 mounted on the reduced portion 8 is firmly held against the shoulder 7 by means of a nut 10 which is threaded on the extremity 11 of the body. The cutter is held against rotational displacement on the body by means of a key 12 which is disposed in aligned slots 13 and 14 respectively provided in the cutter and the body. The key is fixed in place by a screw 15 threaded into the body.

A bearing sleeve 16 of bronze is mounted on the body and is held at its rear end by a pair of lock nuts 17—17 threaded on the body. The front end of the sleeve is spaced from the rearwardly facing shoulder 18 of the annular flange 6 on the body to provide for the mounting on the body of a collar 19. The collar has the same external diameter as the sleeve 16 and is held thereby against the shoulder 18.

The collar, which is preferably of steel, is provided on its outer surface with a plurality of longitudinally extending and equally spaced grooves 20. An insert 21 of hard facing material such as carboloy or tungsten carbide is placed in each groove and bonded to the collar by any of the standard fusion welding methods. The flux or welding material is allowed to build up between the inserts which initially project slightly from the collar. When all of the inserts have been fixed in the grooves the outer surface is ground to proper size.

The front face of the collar between the grooves 20 is provided with substantially semi-cylindrical vertical grooves 22 which merge with similar horizontal grooves 23 formed in the inner wall of the collar. The grooves 23 extend approximately one-half the length of the collar so as to be in communication with an annular groove 24 formed in the body 5 and a groove 25 in the key. Oil is conducted to the groove 24 through radial passages 26 which lead from a central longitudinal passage 27 in the body. The front end of the passage 27 is closed by a plug 28.

The collar 19 with the hard facing inserts 21 serves as a guide to take the pressure against the lands of the gun barrel without wear and without scoring. The bronze sleeve 16 serves to steady the rifling head as it is forced through the bore of the gun barrel to cut the grooves. It will be noted that the portions of the cutter and body between the blades 29 of the cutter and the collar 19 are of reduced diameter and provide an annular space which permits oil to flow from the grooves 22 to the cutter blades. As is well understood in the art of broaching a series of cutters is provided for successive application to the work.

We claim:

1. In a rifling tool, a body having an annular flange with a forwardly facing shoulder extending to a reduced portion, a cutter mounted on the reduced portion of the body, a nut holding the cutter against the shoulder of the body, means for keying the cutter to the body, a steel collar mounted on the body in the rear of the flange, said collar including in its outer wall longitudinally extending hard facing inserts, said collar having oil passages between the inserts, the body having oil passages in communication with the oil passages in the collar, and a bronze bearing sleeve on the body in rear of the collar.

2. In a rifling tool, a body having an annular flange with a forwardly facing shoulder extending to a reduced portion, a cutter mounted on the reduced portion of the body and abutting against the shoulder, means for keying the cutter to the body, a collar having a hard facing surface mounted on the body in rear of the flange, said collar having passages for conducting oil to the cutter, and a bearing sleeve on the body in rear of the collar.

3. In a rifling tool, a body having an annular flange with a forwardly facing shoulder extending to a reduced portion, a cutter mounted on the reduced portion of the body, means for holding the cutter against the shoulder of the body, means for keying the cutter to the body, a collar mounted on the body in the rear of the flange, said collar including in its outer wall hard facing inserts, said collar having oil passages between the inserts, the body having oil passages in communication with the oil passages of the collar, and a bearing sleeve on the body in the rear of the collar.

4. In a rifling tool, a body having an annular flange with a forwardly facing shoulder extending to a reduced portion, a cutter mounted on the reduced portion of the body and abutting against the shoulder, means for keying the cutter to the body, a collar having a hard facing surface mounted on the body in the rear of the flange, and means for conducting oil to said cutter.

5. In combination with a rifling tool, a guide member comprising a steel collar adapted to concentrically surround said tool and having in its outer wall longitudinally extending spaced grooves, an insert of hard facing material in each groove, said collar having oil passages between the inserts.

6. In combination with a rifling tool, a guide member adapted to concentrically surround said tool and comprising a collar having in its outer wall longitudinally extending spaced grooves and an insert of hard facing material in each groove.

FRANK A. MILLER.
JOHN D. DE VOGE.